United States Patent
Shanklin et al.

(10) Patent No.: US 9,589,130 B2
(45) Date of Patent: Mar. 7, 2017

(54) APPLICATION TRUST-LISTING SECURITY SERVICE

(71) Applicants: Steven Dale Shanklin, Austin, TX (US); Steven R. Snapp, Cedar Park, TX (US)

(72) Inventors: Steven Dale Shanklin, Austin, TX (US); Steven R. Snapp, Cedar Park, TX (US)

(73) Assignee: White Cloud Security, L.L.C., Austin, TX (US)

( * ) Notice: Subject to any disclaimer, the term of this patent is extended or adjusted under 35 U.S.C. 154(b) by 0 days.

(21) Appl. No.: 14/464,422

(22) Filed: Aug. 20, 2014

(65) Prior Publication Data

US 2015/0074759 A1    Mar. 12, 2015

Related U.S. Application Data

(60) Provisional application No. 61/868,047, filed on Aug. 20, 2013.

(51) Int. Cl.
| | |
|---|---|
| G06F 21/51 | (2013.01) |
| G06F 21/56 | (2013.01) |
| H04L 29/06 | (2006.01) |
| H04L 29/08 | (2006.01) |

(52) U.S. Cl.
CPC .......... *G06F 21/51* (2013.01); *G06F 21/564* (2013.01); *G06F 21/566* (2013.01); *H04L 63/102* (2013.01); *H04L 63/123* (2013.01); *H04L 67/02* (2013.01); *H04L 63/168* (2013.01)

(58) Field of Classification Search
CPC ...... G06F 21/51; G06F 21/566; G06F 21/564; H04L 63/123; H04L 67/02; H04L 63/102; H04L 63/168
USPC .......................................................... 726/3
See application file for complete search history.

(56) References Cited

U.S. PATENT DOCUMENTS

| | | | |
|---|---|---|---|
| 6,567,917 B1 * | 5/2003 | Ziese | G06F 21/64 380/279 |
| 7,370,345 B2 | 5/2008 | Bardsley et al. | |
| 2005/0268341 A1 * | 12/2005 | Ross | G06F 21/64 726/26 |

(Continued)

OTHER PUBLICATIONS

International Searching Authority, "International Search Report," Jan. 22, 2015.

*Primary Examiner* — Robert Leung
*Assistant Examiner* — Thomas Ho
(74) *Attorney, Agent, or Firm* — Gregory K. Goshorn; Greg Goshorn, P.C.

(57) ABSTRACT

Provided are techniques for controlling access to computing resources comprising generating a first fingerprint corresponding to a first executable file; storing the fingerprint in a non-transitory computer-readable storage medium; receiving a request to execute a second executable file on a computing system; generating a second fingerprint corresponding to the second executable file; determining whether or not the first fingerprint matches the second fingerprint; and, in response to determining that the first and second fingerprints match, executing the executable file on the computing system; and, in response to determining that the first and second fingerprints do not match, preventing the executable file from executing on the computing system.

17 Claims, 5 Drawing Sheets

(56) References Cited

U.S. PATENT DOCUMENTS

| | | | |
|---|---|---|---|
| 2011/0047620 A1* | 2/2011 | Mahaffey | G06F 21/564 726/23 |
| 2012/0072731 A1 | 3/2012 | Winograd et al. | |
| 2012/0084263 A1 | 4/2012 | Gosnell | |
| 2013/0111547 A1 | 5/2013 | Kraemer | |

* cited by examiner

APPLICATION TRUST-LISTING SECURITY SERVICE

CROSS-REFERENCES TO RELATED APPLICATIONS

The present application claims the benefit of the filing date of a provisional application entitled, "A Cloud-based Application Trust-Listing Security Service that Prevents Unauthorized Programs From Running on Users' Computer Systems and Devices Using a Social Media Network for Crowd-Sourcing of Application Trust" Ser. No. 61/868,047, filed Aug. 20, 2013, assigned to the assignee of the present application, and herein incorporated by reference.

FIELD OF THE DISCLOSURE

The claimed subject matter relates generally to computing systems and, more specifically, to techniques for preventing untrusted or unauthorized applications from gaining access to protected information or misusing computing resources.

BACKGROUND

Today, computing, or 'processing," systems are involved in almost every technical device produced. Processing systems may come in the form of, for example, laptops, tablets, iPads and desktops. In addition, processors may be found in smart phones, SCADA, process control systems, Point-of-Sale terminals, kiosks, ATMs, Casino Gaming equipment, medical equipment, embedded systems, network appliances, cloud and data center servers and automated self-driving cars. Unfortunately, any processing system may be the target an unauthorized access attempt, even systems with required security updates or without known security holes.

Hackers and other unauthorized computer and device users can run unknown, unfrosted or unauthorized applications on computer systems and devices to gain access to protected information or misuse computing resources. Two current techniques for protecting computing systems and devices are white lists and black lists. A white list (or whitelist) is a list or register of applications that are being provided a particular privilege, service, mobility, access or recognition. In other words, applications or processes on a white list are accepted, approved or recognized as being legitimate applications or processes. A blacklist (or black list) is a list or register of entities or people who, for one reason or another, are denied a particular privilege, service, mobility, access or recognition.

Currently, white lists are primarily based upon application or process names, which may be spoofed, upon signing certifications which can be forged using stolen signing certificate keys or upon cryptographic hashes or simple checksums. Blacklists are primarily based upon a signature which identifies a code sequence pattern, the examination of file formats and code statistics on the frequency of interrupt vectors and code used (or the absence of use) or a behavioral profile of computer resource misuse determined with dynamic heuristics where programs execution is emulated in a closed environment.

SUMMARY

Provided are techniques for preventing untrusted or unauthorized applications from gaining access to protected information or misusing computing resources. Techniques include: 1) a cloud-based application fingerprint database submission and subscription process; 2) an HTTP or DNS protocol for application identification fingerprint queries; 3) optional organization specific application control zones; 4) zone based application control of dynamically connected mobile devices; 5) IP Gap technology; and 6) a trust-listing endpoint management as a service technology to provide just-in-time application fingerprint verification to prevent unauthorized programs from running on users computer systems and devices. Protected endpoints check the fingerprints of programs and executable components that try to execute against a fingerprint database in the service to determine if that program or executable component is authorized to run on that endpoint at that time and, optionally, in a particular zone. Unauthorized programs are not allowed to execute. This protects users information and resources from unauthorized access and use.

A Trust-listing's just-in-time verification does not require a scan of a system before protection can begin. In addition, a crowd-sourcing community may validate which programs and executable components can be trusted. Unsophisticated users using a social media community can choose to follow highly rated experts or groups of experts who provide trust-listing signatures, or fingerprints. The trust-listing system does not require any highly complex trusted-change technology. When applications are found to be vulnerable or malware, they can then be disabled from execution with a single user button click. When followed experts or groups of experts are found to be untrustworthy, their recommendations of trust can be disabled from execution with a single user button click.

Provided are techniques for controlling access to computing resources comprising generating a first fingerprint corresponding to a first executable file; storing the fingerprint in a non-transitory computer-readable storage medium; receiving a request to execute a second executable file on a computing system; generating a second fingerprint corresponding to the second executable file; determining whether or not the first fingerprint matches the second fingerprint; and, in response to determining that the first and second fingerprints match, executing the executable file on the computing system; and, in response to determining that the first and second fingerprints do not match, preventing the executable file from executing on the computing system.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION OF THE FIGURES

Figure 1:
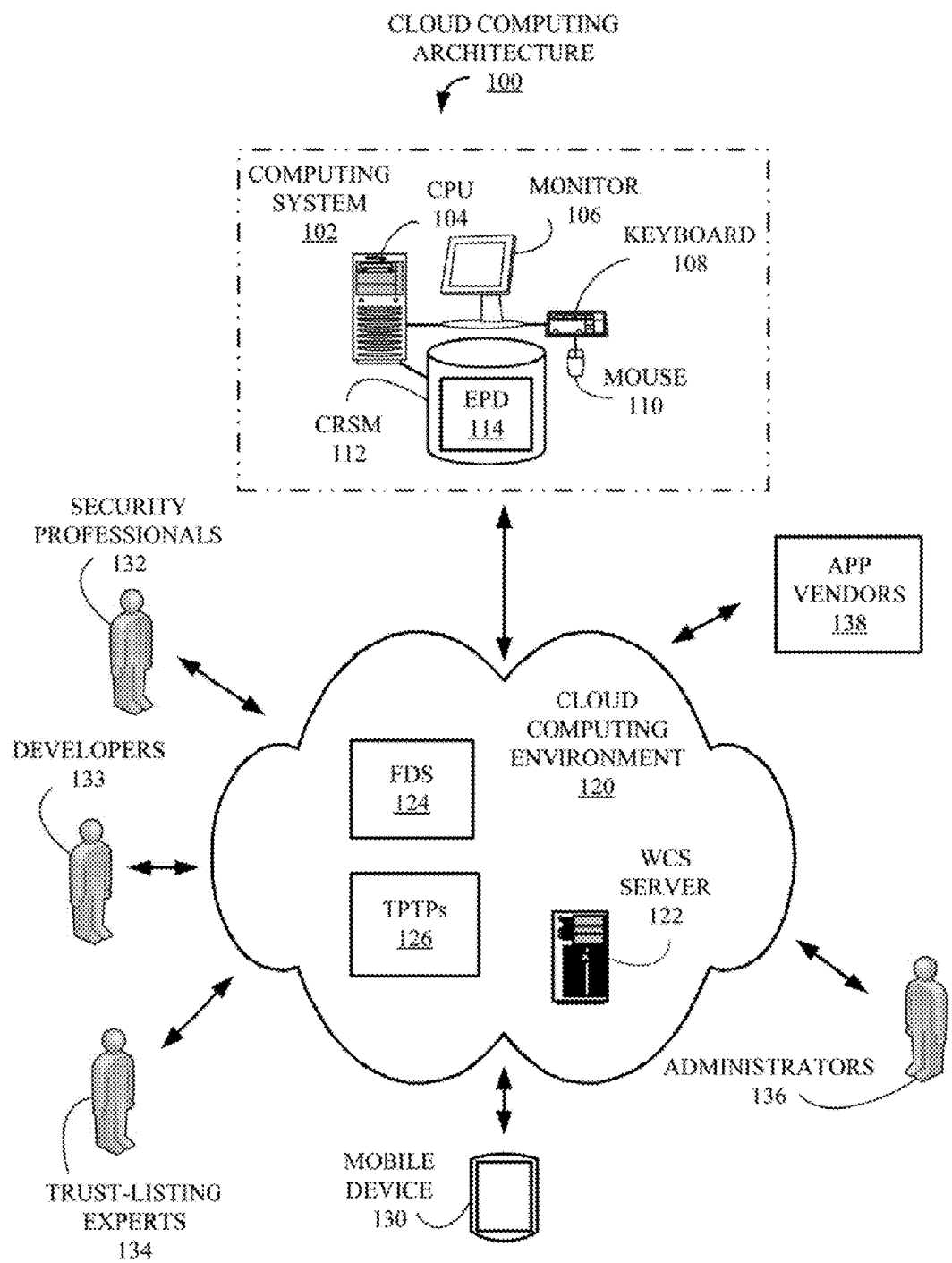
FIG. 1 is a block diagram of a cloud computing architecture that may implement the disclosed technology.

Although described with particular reference to a cloud computing environment, the claimed subject matter can be implemented in any information technology (IT) system in which the protections of computers and computing resources is desirable. Is should also be noted that, although described with reference to "applications," "processes" and "dlls," the claimed subject matter is also applicable to any executable logic. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

As the Inventors herein have realized, one problem with the use of a white list is that white lists, or white listing services, may include malware in their scan of a newly installed endpoint, an endpoint typically being a connection point where a particular service may be accessed. In addition, a white-listing system may require complex and non-bounded trusted-change technologies to ensure that updated programs are able to run in the white-listed environment. Further, when a new end-point is white-listed, if malware or unauthorized software is already installed, the malware or unauthorized software may be mistakenly added to the white list and allowed to run. Administrators' or users' settings in policy that allow applications to execute on protected systems cannot be easily disabled because of the complexity of the policies they may be buried therein.

Although vendors typically update their white list when software manufacturers update applications, this creates a labor intensive effort as software manufacturers use various different techniques to update their software, sometime even changing the method on a single application from one version to the next. Further, software manufacturers have been increasing the rate at which they update their applications. This creates an unbounded problem that white-listing providers cannot solve with any known uniform and all-encompassing technique.

The following is a list of individual components or elements that make up one embodiment of the claimed subject matter:

1) North Star fingerprint database service that contains application signatures, or fingerprints, and the crowd-sourcing community and social media information (see 124, FIGS. 1 and 2);
2) Chromosphere zone management service for organizational control of computers and devices (see 206, 210 and 212, FIG. 3);
3) JetStream endpoint management platform as a service for non-enterprise endpoint management (see 226, FIG. 3);
4) Starlight endpoint driver that applies trust-listing fingerprints to control application execution (see 114, FIG. 1).
5) Application fingerprint (fingerprint) collection and uploading for new applications (see 148, FIG. 2; 226, FIG. 3);
6) Application Fingerprint Crowd-sourcing by trust-listing providers (see 132, 133, 134, 136, 138 FIG. 1).
7) Social Media for the quality of applications, fingerprints and fingerprint providers (see 156, FIG. 2; 226, 228, FIG. 3);
8) Experts upload application fingerprints, trust application and make recommendations via social media and provide security alerts;
9) Follow Experts for their fingerprints, recommendations and security alert;
10) Manager/Parental control of application authorization;
11) Management of when and where applications can run on the protected computers and mobile devices;
12) Just-in-time fingerprint trust query execution in real-time using the proven DNS distributed data server model;
13) Cloud-based application fingerprint database submission and subscription process;
14) IP Gap technology to protect databases from unauthorized modification (see FIG. 5);
15) Use social media to implement a security community ecosystem that pays fingerprint contributors;
16) DNS type zone transfer model to update Chromosphere fingerprint databases on air-gapped private networks (see 216, FIG. 3);
17) Application control of dynamically connected laptops, notebooks, and mobile devices;
18) Control of which desktop, iOS, and Android applications are allowed to execute within an organization's protected networks as mobile platforms and devices dynamically connect to them;
19) Application identification fingerprints for trust-listing protection;
20) Security Engineer and community identification of malware or vulnerable applications;
21) Allows users and Security Engineers to submit fingerprints for application identification and definition by the community;
22) Allows users to select which application fingerprint providers they trust and follow;
23) Subscribers may be only charged for fingerprint queries that result in the identification of either known malware or applications that are classified as safe to use;
24) Allows users to disable application execution;
25) A scalable trust-listing management interface for small businesses and parental control to manage when and were apps can run on the protected computers and mobile devices;

26) May operate in a secure cloud environment with automatic scaling to handle flash-crowds or endpoints and endpoint management users;
27) Fingerprint Identification Service is a DNS-based communications protocol used to make application signature (fingerprint) queries;
28) Fingerprint queries can be done protocols such as, but not limited to, HTTP and HTTPS;
29) Users trust protection or vendors directly instead of relying upon the trust selection of experts.

Turning now to the figures, FIG. 1 is a block diagram of a cloud computing architecture 100 that may implement the disclosed technology. A computing system 102, used as an example of a system that may be protected in accordance with the claimed subject matter, includes a central processing unit (CPU) 104, coupled to a monitor 106, a keyboard 108 and a pointing device, or "mouse," 110, which together facilitate human interaction with elements of cloud computing architecture 100 and computing system 102. IT should be understood that a computing system may be configured in many different ways. For example, rather than a keyboard and mouse, computing system 102 may have a touchscreen or may have no human interaction at all.

Also included in computing system 102 and attached to CPU 104 is a non-transitory computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing logic associated with an End Point Driver (EPD) 114. In short, EPD 114 applies trust-listing signatures to control application and process execution on computing system 102. EPD 114 accesses a scalable trust-listing management interface of WCS server 122 in cloud computing environment 120 to manage when and where applications can run. EPD 114 is explained in more detail below in conjunction with FIGS. 2-5. It should be noted that a typical computing system would include more elements, but for the sake of simplicity only ones necessary to describe the claimed subject matter are shown.

Computing system 102 is communicatively coupled to a cloud computing environment, or simply the "cloud" 120. As should be familiar to those with skill in the relevant arts and as defined by Wikipedia, cloud computing is the delivery of computing as a service rather than a product, whereby shared resources, software, and information are provided to computers and other devices as a utility (like the electricity grid) over a network (typically the Internet). Clouds can be classified as public, private or hybrid. Also communicatively coupled to cloud 120 is a mobile device 130, which may for example a mobile computer, a tablet computer or a telephone. Mobile device 130 is merely used as an example of a device other than a computing system such as computing system 102 that may employ the claimed subject matter for security. Although in this example, computing system 102 and cloud 120 are communicatively coupled via the Internet (not shown), they could also be coupled through any number of communication mediums such as, but not limited to, a local area network (LAN) (notshown), direct wire and wireless connections. In the alternative, Cloud Computing Environment 120 might also be implemented as a "cloud" instance of standalone individual components via a single software appliance without the redundant resources found in a typical cloud environment deployment.

In this example, aspects of the claimed subject matter are provided by a White Cloud Security (WCS) server 122, a Fingerprint Database Service (FDS) 124 and Third Party Trust Providers (TPTPs) 126. In addition, aspects of the claimed subject matter may be provided in part by security professionals 132, developers 133, trust-listing experts 134, administrators 136 and application, or "app," vendors 138. FDS 124 stores fingerprints of applications and processes and well as crowd-sourcing community and social media information. The crowd-sourcing of application identification fingerprints provides a high degree of information about the trust-worthiness of running an application on a user's computer system or device. PTPs 126 stores the application trust selections, recommendations and information provided by security professionals 132, developers 133, trust-listing experts 134, administrators 136 and app vendors 138. Although not illustrated, WCS server 122 would typically include a CPU and CRSM any might include a monitor, keyboard and mouse.

It should be understood that, throughout the specification, the term "signature" is used interchangeably with the term "fingerprint." While a signature, e.g., on a check, may be forged, a fingerprint typically may not. In other words, the terms "signature" and "fingerprint" are used as to describe a characteristic of a process or application that is determined by examining the process or application and which typically cannot be forged or spoofed.

The function of EPD 114, WCS server 122, FDS 124, TPTPs 126 and the roles played by parties such as parties 132, 133, 134, 136 and 138 are explained in more detail below in conjunction with FIGS. 2-5. Further, it should be noted there are many possible cloud computing architecture configurations, of which cloud computing architecture 100 is only one simple example. For example, FDS 124 and TPTPs 126 may be incorporated into WCS server 122.

Figure 2:
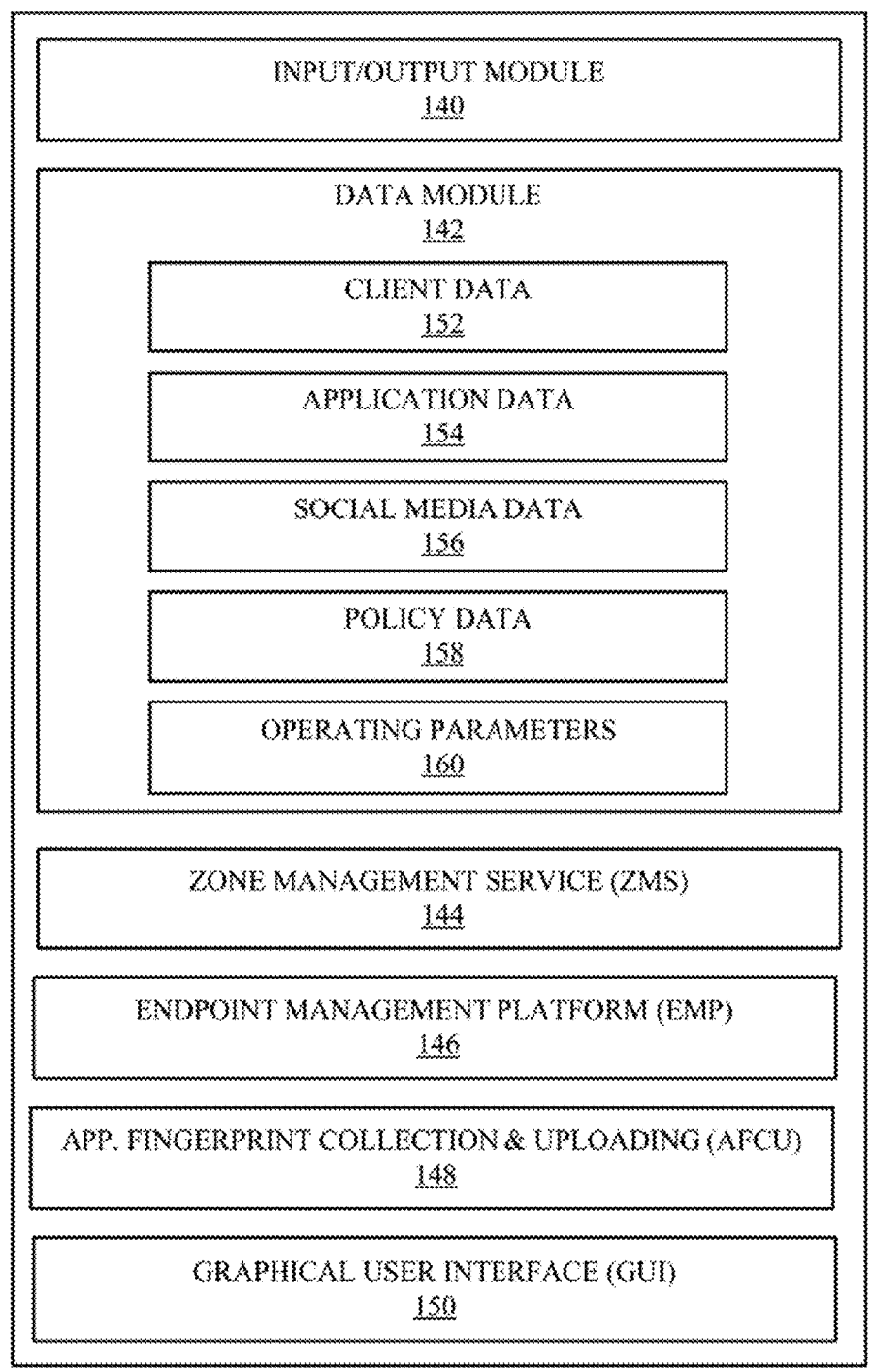
FIG. 2 is a block diagram of a Fingerprint Database Service (FDS), first introduced above in conjunction with FIG. 1.

FIG. 2 is a block diagram of FDS 124, introduced above in FIG. 1, in greater detail. FDS 124 includes an input/output (I/O) module 140, a data module 142, a Zone Management Service (ZMS) 144, an Endpoint Management Platform (EMP) 146, a Application (App.) Fingerprint Collection and Uploading (AFCU) module 148 and a graphical user interface (GUI) 150. For the sake of the following examples, logic associated with FDS 124 is assumed to be stored on a non-tangible, computer readable storage medium (CRSM) (not shown) associated with WCS server 122 (FIG. 1) and execute on one or more processors (not shown) of WCS server 122. It should be understood that the claimed subject matter can be implemented in many types of computing systems and data storage structures but, for the sake of simplicity, is described only in terms of WCS server 122 and architecture 100 (FIG. 1). Further, the representation of FDS 124 in FIG. 2 is a logical model. In other words, components 140, 142, 144, 146, 148 and 150 may be stored in the same or separates files and loaded and/or executed within architecture 100 either as a single system or as separate processes interacting via any available inter process communication (IPC) techniques or application programming interfaces (APIs).

I/O module 140 handles any communication FDS 124 has with other components of FDS 124 and architecture 100. Data module 142 is a data repository for information, including data, that FDS 124 requires during normal operation. Examples of the types of information stored in data module 142 include client data 152, application data 154, social media data 156, policy data 158 and operating parameter 160.

Client data 152 stores information relating to clients, or users, that take advantage of the service provided by FDS 124 and the related elements. In addition, the term "clients"

may include experts and administrators that contribute to and manage the system, respectively. In one model, users may subscribe to the service and pay a set price for each application fingerprint query (see 300, FIG. 4). In an alternative model, a subscription may be based upon a flat fee for a specified period of time. Information may also be stored on trust-listing providers. For example, when an expert is fund to have been untrustworthy, they can be marked as untrusted with a single button click which automatically disallows all trust recommendations from any application trust they have provided. The basis for trust for those applications then falls on any other experts that are providing trust recommendations for them or upon the user's own application trust selections.

Application data 154 stores the signatures, or fingerprints, of application and processes that have been approved for execution. In addition, information corresponding to applications or process, e.g., malware or vulnerable applications, that should not be permitted to execute may also be stored. Fingerprints for applications and processes may be generated based upon a "hash" of the corresponding application or process. As should be familiar to those with skill in the relevant arts, there are several hashing technologies that may produce a fingerprint (signature) such as, but not limited to, MD5, CRC32, SHA-1, SHA-256, SHA-512 and to file length (element size). An application or process (or executable component) may be identified by its file length (element size) combined with one or more of the fingerprints from the hashes generated for that file. Combining the file length (element size) and one fingerprint hash helps avoid hash collisions. Combining multiple fingerprints (e.g. SHA-1, SHA-256, and SHA-512) with the file length (element size) dramatically reduce to nearly zero the possibility of hash collisions which an attacker might attempt to use to misidentify their malware as a valid trusted application. Further, each fingerprint may also be correlated with particular users, computing systems and/or zones to provide "zone control," which is described in more detail below. Signatures may be queried using protocols such as, but not limited to, HTTP and HTTPS or queried by FISs (see 306, 310 and 312, FIG. 3).

Social media data 156, provides information relating to crowd-sourced and expert provided information on the quality of applications, fingerprints and fingerprint providers. Social media data 156 enables experts to provide recommendations and provide security alerts and enables users to follow selected users for their contributed signatures, application trust selections, recommendations and security alerts. In addition, social media data 156 may provide information for the implementation of a security community ecosystem that pays signature, recommendation and alert contributors.

Policy data 156 stores information on administrative policies of FDS 124 including, but not limited to, the actual implementation of payments and zone control. Operating parameters 158 stores information on various administrative preferences that have been set, including but not limited to the look and feel of GUI 150.

ZMS 144, also referred to as a Fingerprint Identification Service (FIS), provides for organizational control of computers and devices. In other words, provides application and process control, i.e., control of where and when an application or process can run, of dynamically connected computing devices such as, but not limited to, laptops, notebooks and mobile devices. When user's computer systems and devices move onto an organization's protected zone, a FIS provides a set of signature (fingerprint) policies that control which applications are allowed to run on the users system/device and under what conditions they are allow to run. DHCP or other similar logon technologies direct the dynamically connected devices to use the FIS DNS-based fingerprint Identification Service. Although illustrated as part of FDS 124, ZMS may also be independent modules located in the corresponding computer, devices and zones being controlled (see 206, 210, 212, FIG. 3). With multiple FISs, Fingerprints may be provided as just-in-time trust query execution in real-time using currently available DNS distributes data server model techniques.

EMP 146 provides the ability to manage endpoints associated with FDS 124. Each endpoint's EPD connects to a specific FDS for management and application trust validation. AFCU 148 provides for the collection and uploading of signatures, or Fingerprints, of new or modified applications and processes. As previously explained, fingerprints may be provided by security professionals 132 (FIG. 1), developers 133, trust-listing experts 134 (FIG. 1), administrators 136 (FIG. 1) and application, or "app," vendors 138 (FIG. 1). Fingerprints may be collected by a variety of techniques, including, but not limited to, crowd-sourcing and tools associated with social media (see 156) and other cloud-based submission and subscription processes. In addition to fingerprints, app vendors 138 (FIG. 1) and trusted developers (not shown) may simply provide executables in the form of applications, processes or dynamically linked libraries (DLLs), which are then processed by AFCU 148 to generate corresponding fingerprints (see 204, FIG. 3).

GUI component 150 enables administrators 136 (FIG. 1) and users of FDS 124 to interact with and to define the desired functionality of FDS 124. For example, GUI 150 may provide manager/parental control of application and process authorization, typically by uploading and setting information into data module 144. Further, GUI 150 may provide access to security professionals 132 (FIG. 1), developers 133 (FIG. 1) trust-listing experts 134 (FIG. 1). GUI 150 may also provide a social media interface to rate applications, signatures, and experts, allowing experts to be followed for their signatures, application trust selections, application recommendations, and security alerts, and allow users to submit signatures for identification and definition by the community, and to pay signature contributors who collect and upload application signatures and provide application trust recommendations. In this manner, users can choose which experts to trust and follow for signatures, application trust selections, application recommendations, and security alerts. Elements 142, 144, 146, 148, 159, 152, 154, 156, 158 and 160 are described in more detail below in conjunction with FIGS. 3-5.

Figure 3:
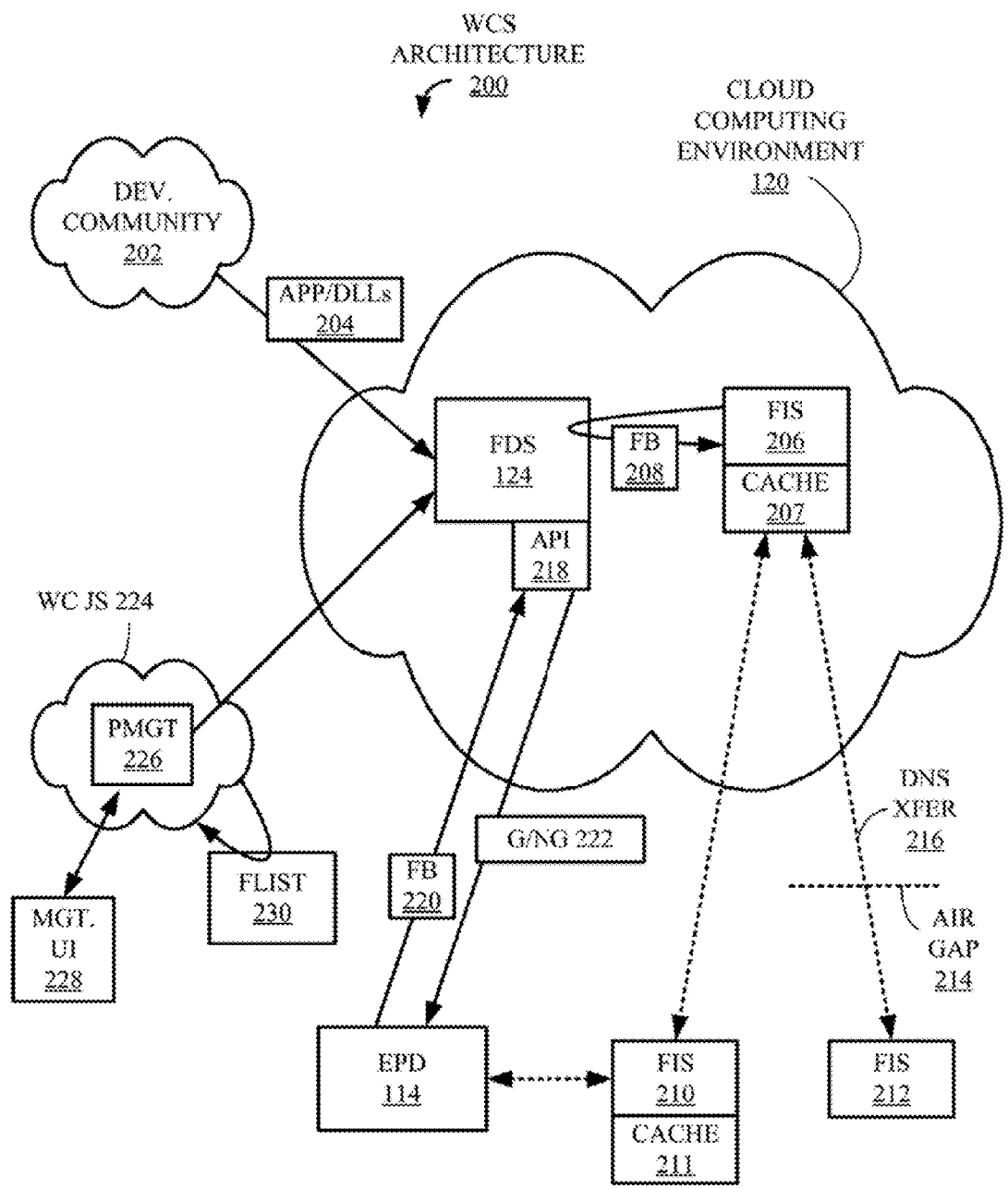
FIG. 3 is a block diagram of a White Cloud Security (WCS) architecture that may implement aspects of the claimed subject matter.

FIG. 3 is a block diagram of a White Cloud Security (WCS) architecture 200 that may implement aspects of the claimed subject matter. Like architecture 100, WCS architecture 200 includes EPD 114, cloud computing environment 120 and FDS 124. A development community 202, which in this example corresponds to app. vendors 138 (FIG. 1), provide approved applications and libraries (App/DLL) 204 to FDS 124 for inclusion in data module 142 (see 148, FIG. 2). EPD 114 may query FDS 124 via, for example, and application programming interface (API) 218 provided by FDS 124 or a FIS such as FIS 206.

A FIS 206 (see ZMS 144, FIG. 2) and a corresponding cache 207 provide zone control for cloud computing environment 120 based upon a fingerprint block (FB) 208 or a FB 220 provided by FDS 124, relayed via FIS 206/cache 207 or API 218, respectively. Zone control may be applied, for example to, dynamically connected laptops, notebooks and mobile devices in an organization's network. It should be noted that FBs 208 and 220 may be individual signatures sent by 206 or API 218 as needed, i.e., "just-in-time," far verification of a particular application or process or a block of signatures transmitted periodically and stored in cache 207 for FIS operations to be used as needed. In other words, FISs may each store their own signature database that is periodically updated. FIS 212 is illustrated as separated by an air, or IP, gap 214 and serviced by a DNS zone transfer (Xfer) 216 of fingerprint data. A FB 220 is also transmitted to EPD 114 for use in computing system 102 (FIG. 1). Additional FISs, i.e., a FIS 210 and a FIS 212 provide zone control for other protected zones, organizations or computing devices. Like FIS 206, FIS 210 includes a cache 211. In this example, a potential application execution on computing system 102 triggers a Request (see 306, FIG. 4) from EPD 114 to FDS 124, which is responsible for transmitting as Go/No GO decision 222 to EPD 114 (see 316, FIG. 4). FIS 210 and the corresponding lines represent an alternative path for this exchange. (see 300, FIG. 4).

A White Cloud Java Script (WCJS) 224 provides administrators with Profile Management (PMGT) 226 via a management user interface (Mgt. UI) 228 (see GUI 150, FIG. 2). In this manner, an administrator or other user, such as administrators 136 (FIG. 1), may manage application fingerprint lists (FLIST) 230 to be uploaded, deleted or marked as malware, an untrusted application or application to be denied execution. In addition, PMGT 226, as well as FISs 206, 210 and 212, enables managers/parents to control the authorization of applications in a secure cloud environment with automatic scaling to disable application execution (see 309, FIG. 4). PMGT 226 also provides a sealable trust-listing management interface to manage the conditions under which an application can run. PMGT 226 enables user to disable application execution and may provide email notifications in the event an application needs approval to execute.

Figure 4:
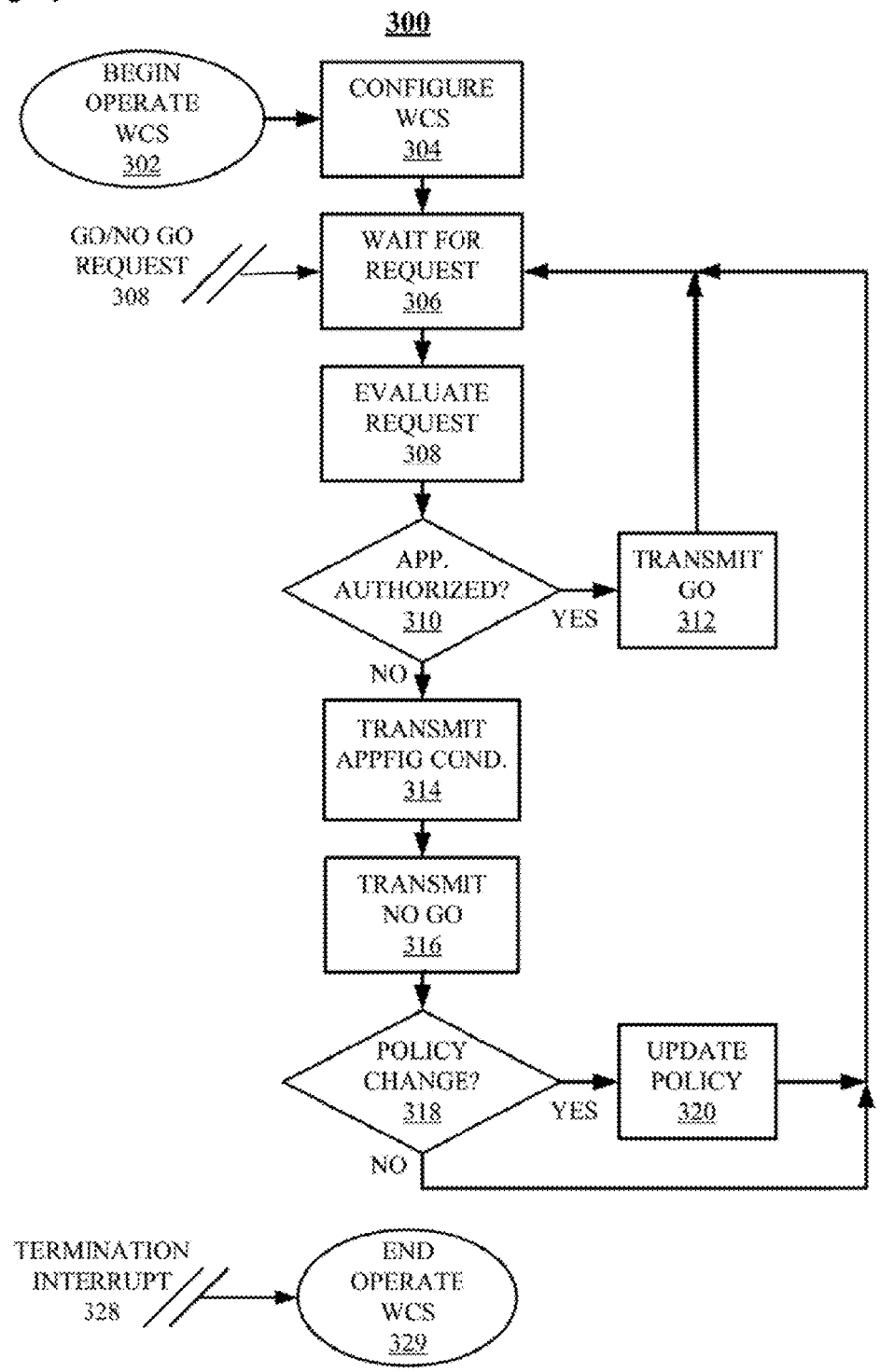
FIG. 4 is a flow chart of a "Operate WCS" process that may implement aspects of the claimed subject matter.

FIG. 4 is a flow chart of a "Operate WCS" process 300 that may implement aspects of the claimed subject matter. In this example, process 300 is associated with logic stored on a CRSM (not shown) of WCS server 122 (FIG. 1) and executed on one or more processors (not shown) of a CPU (not shown) of server 122. It should be understood that process 300 may be performed by zone control modules such as FIS 206 (FIG. 3) in conjunction with a local cache of application fingerprints such as cache 207 (FIG. 3). Process 300 illustrates a decision making process to either enable or deny an application or process access, in this example, to computing system 102. It should be understood that, in an alternative embodiment, a go/no go decision may also be made at a server such as server 122 and transmitted to computing system 102 rather than performed locally.

Process 300 starts at a "Begin Operate WCS" block 302 and proceeds immediately to a "Configure WCS 304. During processing associated with block 304, data necessary for the operation of process 300 is retrieved (see 144, FIG. 2). Once process 300 has been configured, control proceeds to a "Wait for Request" block 306 during which process 300 waits for a request from an endpoint driver such as EPD 114 (FIG. 1) on to whether or not to allow a particular application or process to execute on, in this example, computing system 102 (FIG. 1). A request may be transmitted in a number of ways including but not limited to, HTTP, HTTPS or DNS (see 206, 210, 212, FIG. 3). During an "Evaluate Request" block 308, the request received during processing associated with block 306 is evaluated. The evaluation typically involves matching the length and one or more hashes of the executable file to produce a fingerprint of the particular application or process and comparing the fingerprint to fingerprints stored in a database (see 154, FIG. 2) associated with FDS 124. Trust selection information associated with fingerprints is also checked by FDS 124 to provide a basis for a decision on whether or not an application is authorized (see 310, FIG. 4) and a subsequent GO/No GO decision (see 312, 316, FIG. 4). Any specific fingerprint may be listed as acceptable, not acceptable or simply not listed.

During processing associated with a "Application (App.) Authorized?" block 310, a determination is made as to whether or not the application is approved for execution, i.e., listed, or not approved, i.e., not listed or specified as a non-approved application or process. If the application or process is approved, control proceeds to a "Transmit GO" block 312 during which the approval is recorded in client data 152 of FDS 124. During, processing associated with block 312, a signal is transmitted to EPD 114 that the application may execute on computing system 102 and the application or process is then allowed to do so.

If, during processing associated with block 310, a determination is made that the application or process is not, approved, control proceeds to a "Transmit Application Fingerprint Condition (AppFig. Con.)" block 314. During processing associated with block 314, the fingerprint associated with the application or process that was not authorized is transmitted to EPD 114 and to FDS 124 for appropriate action and is recorded in client data 152 of FDS 124. Such action may include, but is not limited to, reevaluating the application or process and listing the corresponding fingerprint on either a GO or NO GO list for transmission to appropriate EDPs and FISs. Once an application or process has been determined to be either malware, vulnerable to attack or had its trust recommendations removed, the application or process ma be marked accordingly in FDS 124 and will no longer be allowed to run on an endpoint unless an administrator specifically allows that specific version of the application to run using his trust recommendation. This provides a facility to disallow an administrators' trust override recommendations with the removal of trust from the administrator.

During processing associated with a "Transmit NO GO" block 316, a signal is transmitted to EPD 114 that the corresponding application or process should not be allowed to execute. Queries for fingerprints that do not result in known trusted fingerprints causes EPD 114 to block the application's execution which protects the user from unauthorized access to their information or misuse of their computer resources.

During processing associated with a "Policy Change?" block 318, a determination is made as to whether or not the failure of the application to be approved necessitates a change in policy (see 158, FIG. 2). If so, control proceeds to an "Update Policy" block 320. During processing associated with block 320, the appropriate policy is updated in client data 152 of FDS 124. Once policy has been updated, or, if, during processing associated with block 318, a determination is made that policy does not need to be updated, control returns to Wait for Request" block 306, process waits for the next request and processing continues as described above.

Finally, process 300 is halted by means of a termination interrupt 328, which passes control to an "End Operate WCS" block 329 in which process 300 is complete. Interrupt 328 is typically generated when FDS 124 or server 122 is halted. During normal operation, process 300 continuously loops through the blocks 306, 308, 310, 312, 314, 316, 318 and 320, processing execution requests as they are received.

Figure 5:
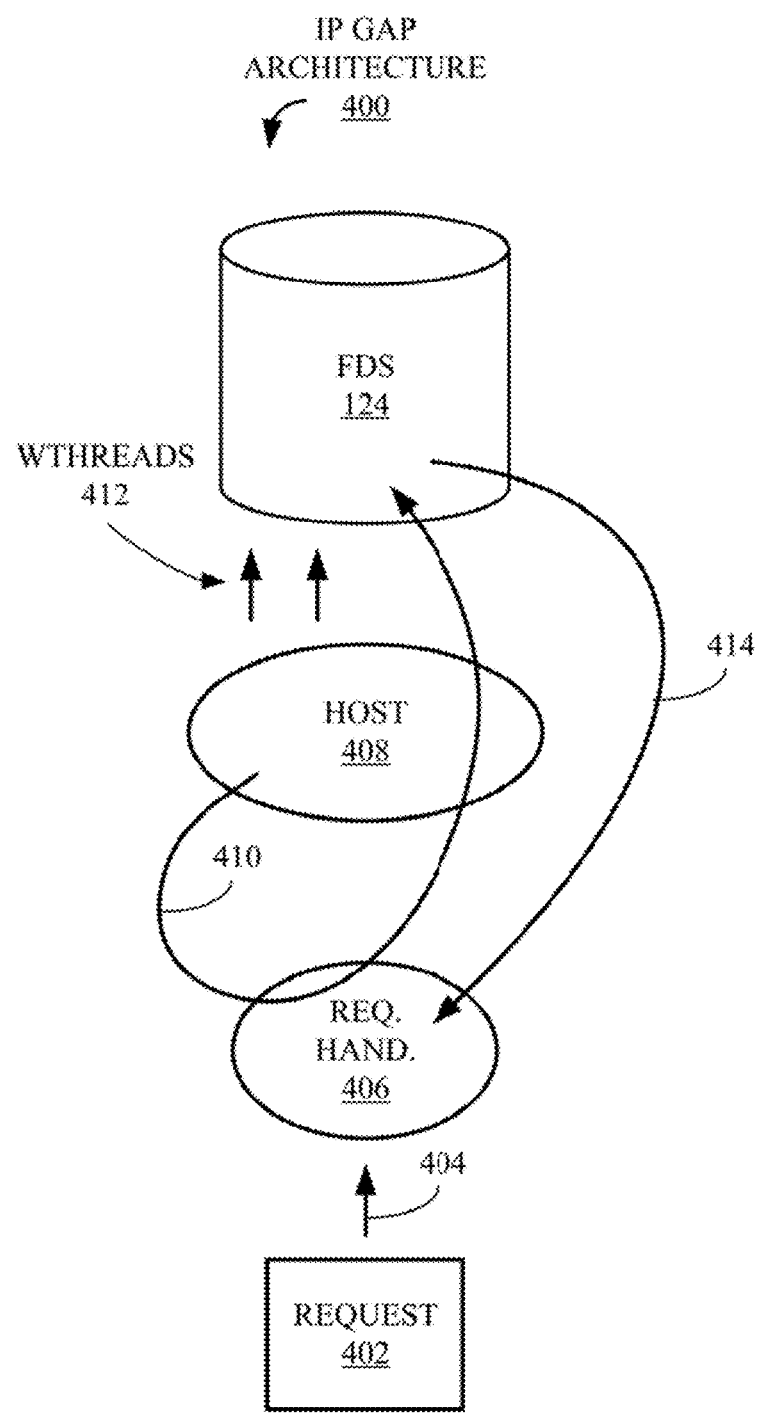
FIG. 5 is a block diagram of an IP Gap architecture employed to protect aspects of the claimed subject matter from unauthorized modifications and intrusions.

FIG. 5 is a block diagram of an IP Gap architecture 400 employed to protect aspects of the claimed subject matter from unauthorized modifications and intrusions. A Request 402 is transmitted 404 by a user or end point driver such as EPD 114 (FIGS. 1 and 3) to determine whether or not an application should be allowed to run (see 300, FIG. 4). Request 402 is received by a Request Handler (Req. Hand.) 406 coupled to a host 408 such as server 122 (FIG. 1). Periodically, host 408 checks 410 req. hand. 408 for pending requests, which are transmitted to FDS 124 (FIGS. 1-3) for verification. Host 408 and FDS 412 may communicate via WThreads 412. A GO/NO GO reply 414 is then transmitted to Req. Hand. 406, which transmits the decision to the EPD that initiated request 402. In this manner, both host 408 and FDS 124 are insulated, and thus protected, from unauthorized modifications and security intrusions. IP Gap 400 protects the fingerprint databases by requiring the database servers to retrieve query requests. The services don't query the database, they submit requests to be fulfilled. In other words, no SQL connectivity need exist. DNS type zone transfers (see 216, FIG. 3) can be used to update IP, or air, gapped FIS services in organizations from FDS 124 master service or other FIS appliances.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

By implementing the claimed subject matter, users don't need to scan an endpoint to determine which applications should be added to a white-list. Signatures, or fingerprints, in the trust-listing database are used to determine if an application is authorized to run or not. Crowd-sourcing of security engineers/experts and groups of experts may provide trust-listing application fingerprints. When a trust-listing provider adds fingerprints for a new application to our trust-listing database, there is no need for a complex trusted-change algorithm to update a white-list on the endpoint. In addition, trust-listing providers may be motivated by receiving revenue on the usage of the application fingerprints that they provide to the system for usage in application trust selection and recommendations.

We claim:

1. A method for controlling access to computing resources, comprising:
    generating a first fingerprint corresponding to a first executable file by combining a first file length corresponding to the first executable file and a plurality of algorithmic hashes of the first executable file;
    generating of second fingerprint comprising combining a second file length corresponding to the second executable file and the plurality of algorithmic hashes of the second executable file by combining a second file length corresponding to the second executable file and the plurality of algorithmic hashes of the second executable file;
    storing, remotely from the first executable file, the fingerprint in a non-transitory computer-readable storage medium;
    receiving a request to execute a second executable file on a computing system, wherein the first executable file and the second executable file are different files;
    generating a second fingerprint corresponding to the second executable file;
    determining whether or not the first fingerprint matches the second fingerprint; and
    in response to determining that the first and second fingerprints match, executing the second executable file on the computing system.

2. The method of claim 1, further comprising, in response to determining that the first and second fingerprints do not match, preventing the second executable file from executing on the computing system.

3. The method of claim 1, further comprising crowd-sourcing the first fingerprint based upon a level of trust a trust list provider has with respect to the first executable file, wherein crowd-sourcing comprises enlisting the aid of users in an online community.

4. The method of claim 1, wherein the first fingerprint is generated and provided to a service that implements the method by a trust list provider based upon a level of trust the trust list provider has with respect to the first executable.

5. The method of claim 4, wherein the trust list provider is selected from a list comprising:
    security professionals;
    application developers;
    trust-listing experts
    administrators; and
    application vendors.

6. The method of claim 4, further comprising generating and storing information corresponding to reliability of the trust list provider.

7. An apparatus for controlling access to computing resources, comprising:
    a fingerprint data base service (DNS), the DNS comprising first logic, stored on a first computer-readable storage medium and executed on a first plurality of processors for:
        generating a first fingerprint corresponding to a first executable file by combining a first file length corresponding to the first executable file and a plurality of algorithmic hashes of the first executable file;
        generating of second fingerprint comprising combining a second file length corresponding to the second executable file and the plurality of algorithmic hashes of the second executable file by combining a second file length corresponding to the second executable file and the plurality of algorithmic hashes of the second executable file, wherein the first executable file and the second executable file are different files;
        storing the first fingerprint remotely from the first executable file;
        determining whether or not the first fingerprint matches the second fingerprint; and
        in response to determining that the first and second fingerprints match, transmitting a first signal indicating that the second executable file may execute.

8. The apparatus of claim 7,
    the first logic further comprising, in response to determining that the first and second fingerprints do not match, transmitting a signal indicating that the second executable file should be prevented from executing on the computing system.

9. The apparatus of claim 1, wherein the first fingerprint is crowd-sourced based upon a level of trust a trust list provider has with respect to the first executable file, wherein crowd-sourcing comprises enlisting the aid of users in an online community.

10. The apparatus of claim 7, further comprising an endpoint management platform (EMP), the EMP comprising logic for receiving the first fingerprint from a trust list provider.

11. The apparatus of claim 10, wherein the trust list provider is selected from a list comprising:
   security professionals;
   application developers;
   trust-listing experts
   administrators; and
   application vendors.

12. The apparatus of claim 10, the EMP further comprising logic for receiving and storing information corresponding to reliability of the trust list provider.

13. A computer programming product for controlling access to computing resources, comprising a on-transitory computer-readable storage medium having program code embodied therewith, the program code executable by a plurality of processors to perform a method comprising:
   generating a first fingerprint corresponding to a first executable file by combining a first file length corresponding to the first executable file and a plurality of algorithmic hashes of the first executable file;
   storing, remotely from the first executable file, the fingerprint in a non-transitory computer-readable storage medium;
   receiving a request to execute a second executable file on a computing system, wherein the first executable file and the second executable file are different files;
   generating a second fingerprint corresponding to the second executable file by combining a second file length corresponding to the second executable file and the plurality of algorithmic hashes of the second executable file;
   determining whether or not the first fingerprint matches the second fingerprint; and
   in response to determining that the first and second fingerprints match, executing the second executable file on the computing system.

14. The computer programming product of claim 13, the method further comprising, in response to determining that the first and second fingerprints do not match, preventing the second executable file from executing on the computing system.

15. The computer programming product of claim 13, the method further comprising crowd-sourcing the first fingerprint based upon a level of trust a trust list provider has with respect to the first executable file, wherein crowd-sourcing comprises enlisting the aid of users in an online community.

16. The computer programming product of claim 13, wherein the first fingerprint is generated and provided to a service that implements the method by a trust list provider based upon a level of trust the trust list provider has with respect to the first executable.

17. The computer programming product of claim 16, the computer program product further comprising generating and storing information corresponding to the reliability of the trust list provider.

* * * * *